(12) United States Patent
Kawato et al.

(10) Patent No.: US 7,253,223 B2
(45) Date of Patent: Aug. 7, 2007

(54) POLYCARBONATE RESIN COMPOSITION AND MOLDED OBJECT THEREOF

(75) Inventors: Hiroshi Kawato, Chiba (JP); Keisuke Funaki, Chiba (JP); Masami Kogure, Chiba (JP); Hiroshi Akamine, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/526,024

(22) PCT Filed: Aug. 6, 2003

(86) PCT No.: PCT/JP03/10023

§ 371 (c)(1),
(2), (4) Date: Jul. 22, 2005

(87) PCT Pub. No.: WO2004/020522

PCT Pub. Date: Mar. 11, 2004

(65) Prior Publication Data

US 2006/0047037 A1 Mar. 2, 2006

(30) Foreign Application Priority Data

Aug. 30, 2002 (JP) .............................. 2002-252628

(51) Int. Cl.
*C08K 3/22* (2006.01)
*C08G 64/00* (2006.01)

(52) U.S. Cl. ........................ 524/266; 524/430; 528/204

(58) Field of Classification Search ................. 524/266, 524/430; 528/204
See application file for complete search history.

(56) References Cited

U.S. PATENT DOCUMENTS 6,465,555 B1 * 10/2002 Nodera et al. ............... 524/414
6,987,141 B2 * 1/2006 Okamoto et al. ........... 524/494
2002/0077417 A1 6/2002 Itagaki

FOREIGN PATENT DOCUMENTS

| CN | 1123291 A | 5/1996 |
|----|-----------|--------|
| EP | 0 692 522 A2 | 1/1996 |
| JP | 5-320519 | 12/1993 |

* cited by examiner

*Primary Examiner*—Kriellion A Sanders
(74) *Attorney, Agent, or Firm*—Oblon, Spivak, McClelland, Maier & Neustadt, P.C.

(57) ABSTRACT

A polycarbonate resin composition which has excellent flame retardancy, even when containing neither any phosphorus compound flame retardant nor any halogenated flame retardant, and which is highly reflective and has light-shutting properties and excellent thermal stability. The polycarbonate resin composition comprises 5 to 98 parts by weight of a polycarbonate/polyorganosiloxane copolymer, 0 to 93 parts by weight of a polycarbonate resin, 2 to 50 parts by weight of titanium oxide, 0 to 1.0 parts by weight of a fibril-forming polytetrafluoroethylene, and 0.05 to 2.0 parts by weight of an organosiloxane, the sum of the ingredients (A), (B), and (C) is 100 parts by weight.

15 Claims, No Drawings

POLYCARBONATE RESIN COMPOSITION AND MOLDED OBJECT THEREOF

TECHNICAL FIELD

The present invention relates to a polycarbonate resin composition and a molding thereof. More particularly, the present invention relates to a polycarbonate resin composition and a molding thereof with excellent heat resistance and flame retardancy, and light reflectance and light-shutting properties of the molding.

BACKGROUND ART

A polycarbonate resin is excellent in mechanical strength (especially, impact resistance), electrical properties, transparency, etc., and has been widely used as an engineering plastic in various fields such as office automation (hereinafter referred to as OA) equipment, electrical and electronic equipment, automobiles, etc. Among them, there is a field in which flame retardancy is required, mainly in the fields of OA equipment, and electrical and electronic equipment. A polycarbonate resin has a high oxygen index among various thermoplastic resins, and is generally considered to be a resin with self-extinguishing properties. However, the flame retardancy level required in the fields of OA equipment and electrical and electronic equipment is generally so high as the V-0 level of UL 94 Standards on flame retardancy, that other flame retardants and auxiliaries are usually added in order to impart the flame retardancy meeting the level.

On the other hand, it is known that a polycarbonate-polyorganosiloxane copolymer or a mixture of the polycarbonate-polyorganosiloxane copolymer and a polycarbonate resin generally shows higher flame retardancy than that of the polycarbonate resin. However, since the flame retardancy of the polycarbonate-polyorganosiloxane copolymer alone is not sufficient to meet the above-mentioned level of the flame retardancy, a composition in combination with various flame retardants has been disclosed (for example, Japanese Patent Application Laid-Open No. 289059/1988 (Showa 63), Japanese Patent Application Laid-Open No. 210462/1989 (Heisei 1), Japanese Patent Application Laid-Open No. 200862/1991 (Heisei 3), Japanese Patent Application Laid-Open No. 202465/1992 (Heisei 4), Japanese Patent Application Laid-Open No. 320519/1993 (Heisei 5), Japanese Patent Application Laid-Open No. 36836/1994 (Heisei 6), Japanese Patent No. 3007046, etc.). However, these disclosed techniques have a drawback, wherein thermal stability is in general decreased when a bromine compound is added as a flame retardant. In the case when a phosphorus compound is added, fluidity is improved, while heat resistance decreases. Especially, when environmental problems are taken into consideration, it has been considered generally difficult to achieve flame retardancy and high reflectance at the same time in a thin-walled molding with a wall thickness of 1 mm or less for a product required in a reflecting plate and the like used for backlight of a liquid crystal display etc., without using a bromine compound or a phosphorus compound.

Furthermore, when such a polycarbonate resin composition is formed to an extruded sheet molding, since not only high reflectance but also high light-shutting properties are required for optical properties in light reflecting applications such as a backlight reflecting plate etc. of a liquid crystal display etc., it is necessary to blend titanium oxide in a high concentration. However, when the titanium oxide was blended in a high concentration, there was a problem in that a polycarbonate resin matrix became degraded, and consequently the light reflectance of a resin molding decreased. Also, when the titanium oxide is blended in a large quantity, decrease in the molecular weight of the polycarbonate becomes substantial, which causes reduction in the mechanical strength. A polycarbonate resin composition blended with titanium oxide, having a good mechanical strength and excellent optical properties after improving the above-mentioned problems has been disclosed in Japanese Patent Application Laid-Open No. 320519/1993 (Heisei 5). Nevertheless, a polycarbonate resin composition is desired, which, in addition to further improving these properties, exhibits excellent flame retardancy without adding a phosphorus compound flame retardant or a halogenated flame retardant while maintaining heat resistance, and also satisfies high reflectance and high light-shutting properties in terms of optical properties.

DISCLOSURE OF THE INVENTION

An object of the present invention is to provide a polycarbonate resin composition solving conventional technical problems described above, and more specifically, to provide a polycarbonate resin composition exhibiting excellent flame retardancy without adding a phosphorus compound flame retardant or a halogenated flame retardant that are not compatible with the environment, having high reflectance and light-shutting properties, and also having excellent thermal stability.

In view of the above situation, the present inventors have performed earnest studies to develop a polycarbonate resin composition showing excellent flame retardancy and having high reflectance and light-shutting properties, and also having excellent thermal stability, and have completed the present invention.

That is, the present invention is an invention with contents summarized below.

[1] A polycarbonate resin composition comprising:
 (A) 5 to 98 parts by weight of a polycarbonate-polyorganosiloxane copolymer,
 (B) 0 to 93 parts by weight of a polycarbonate resin,
 (C) 2 to 50 parts by weight of titanium oxide,
 (D) 0 to 1.0 parts by weight of a fibril-forming polytetrafluoroethylene, and
 (E) 0.05 to 2.0 parts by weight of an organosiloxane, wherein the sum of the ingredients (A), (B), and (C) is 100 parts by weight.

[2] The polycarbonate resin composition according to the above-mentioned [1], wherein the ratio of the polyorganosiloxane part in the polycarbonate-polyorganosiloxane copolymer of the ingredient (A) to the sum of the ingredients (A) and (B) is 0.3 to 10% by weight.

[3] The polycarbonate resin composition according to the above-mentioned [1] or [2], wherein the polyorganosiloxane in the polycarbonate-polyorganosiloxane copolymer of the ingredient (A) is polydimethylsiloxane.

[4] The polycarbonate resin composition according to the above-mentioned [1] or [2], wherein the surface acid content of the titanium oxide of the ingredient (C) is 10 µmol/g or more.

[5] The polycarbonate resin composition according to the above-mentioned [1] or [2], wherein the surface base content of the titanium oxide of the ingredient (C) is 10 µmol/g or more.

[6] The polycarbonate resin composition according to the above-mentioned [1] or [2], wherein the organosiloxane of the ingredient (E) is organopolysiloxane.

[7] The polycarbonate resin composition according to the above-mentioned [1] or [2], wherein the organosiloxane of the ingredient (E) is an alkylhydrogensilicone or an alkoxysilicone.

[8] The polycarbonate resin composition according to the above-mentioned [7], wherein the alkoxysilicone is an organopolysiloxane having a molecular structure in which an alkoxy group bonds to a silicone main chain via a methylene group.

[9] A polycarbonate resin molding obtained by molding of the polycarbonate resin composition according to the above-mentioned [1].

[10] The polycarbonate resin molding according to the above-mentioned [9], wherein the molding is a plate, a sheet, a film, or a molding obtained by thermomolding or pressmolding thereof.

[11] The polycarbonate resin molding according to the above-mentioned [9], wherein the molding is a molding obtained by injection molding.

[12] The polycarbonate resin molding according to any of the above-mentioned [9] to [11], wherein the molding is a light reflector.

[13] The polycarbonate resin molding according to the above-mentioned [12], wherein a reflectance (Y value) of the polycarbonate resin composition composing the light reflector is 93 or more and a total light transmittance thereof (thickness: 1 mm) is 0.6 or less.

[14] The polycarbonate resin molding according to the above-mentioned [13], wherein a product A×B is 150 or more, wherein A (in the unit of nm) is the surface roughness Ra of the light reflector measured through intermittent contact by using an AFM (atomic force microscope) and B (in the unit of g) is the titanium oxide content thereof.

THE MOST PREFERRED EMBODIMENT TO CARRY OUT THE INVENTION

The present invention is now described in detail below.

First of all, a polycarbonate-polyorganosiloxane copolymer (hereinafter it may be abbreviated as a PC-PDMS copolymer) as ingredient (A) composing a resin composition of the present invention, although there are various types, preferably has a polycarbonate part comprising a repeating unit of a structure represented by the following general formula (1),

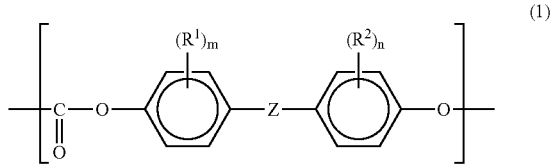

(1)

[wherein, each of $R^1$ or $R^2$ is a halogen atom (for example, chlorine, fluorine, or iodine) or an alkyl group with 1 to 8 carbon atoms (for example, methyl group, ethyl group, propyl group, isopropyl group, various butyl groups (n-butyl group, isobutyl group, sec-butyl group, and tert-butyl group), various pentyl groups, various hexyl groups, various heptyl groups, and various octyl groups). Each of m or n is an integer of 0 to 4, and in the case where m is 2 to 4, each of $R^1$ may be identical or different, and in the case where n is from 2 to 4, each of $R^2$ may be identical or different. And Z is an alkylene group with 1 to 8 carbon atoms or an alkylidene group with 2 to 8 carbon atoms (for example, methylene group, ethylene group, propylene group, butylene group, pentylene group, hexylene group, ethylidene group, isopropylidene group, etc.), a cycloalkylene group with 5 to 15 carbon atoms or a cycloalkylidene group with 5 to 15 carbon atoms (for example, cyclopentylene group, cyclohexylene group, cyclopentylidene group, cyclohexylidene group, etc.), or —$SO_2$— bond, —SO— bond, —S— bond, —O— bond, —CO— bond, or a bond represented by the following formulas (2) or (2')],

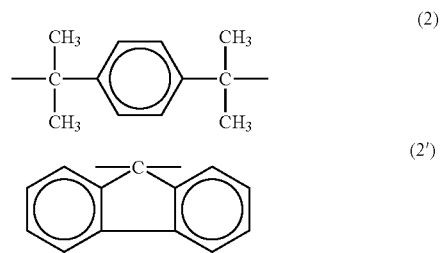

and a polyorganosiloxane part comprising a repeating unit of a structure represented by the following general formula (3),

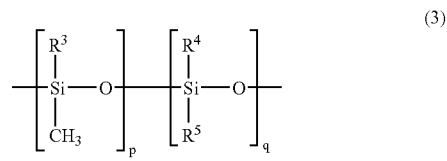

[wherein, each of $R^3$, $R^4$, or $R^5$ is a hydrogen atom, an alkyl group with 1 to 5 carbon atoms, (for example, methyl group, ethyl group, propyl group, n-butyl group, isobutyl group, etc.) or a phenyl group, and each of p or q is 0 or an integer of 1 or larger.] Here, the degree of polymerization of the polycarbonate part is preferably from 3 to 100, and the degree of polymerization of the polyorganosiloxane part is preferably from 2 to 500.

The PC-PDMS copolymer described above is a block copolymer composed of the polycarbonate part having the repeating unit represented by the above-mentioned general formula (1) and the polyorganosiloxane part with the repeating unit represented by the above-mentioned general formula (3), and the viscosity average molecular weight thereof is preferably from 10,000 to 40,000, and more preferably from 12,000 to 35,000. Such a PC-PDMS copolymer can be manufactured, for example, by performing an interfacial polycondensation in a reaction mixture in the presence of a catalyst such as triethylamine, trimethylbenzylammonium chloride, etc., wherein the reaction mixture is prepared by dissolving a polycarbonate oligomer produced in advance (hereinafter, abbreviated as a PC oligomer) composing the polycarbonate part and a polyorganosiloxane, composing the polyorganosiloxane part, which has a terminal reactive group (for example, polydialkylsiloxane such as polydimethylsiloxane (PDMS), polydiethylsiloxane etc., or polymethyphenylsiloxane, etc.) in a solvent such as methylene chloride, chlorobenzene, chloroform, etc., and adding an aqueous sodium hydroxide solution of bisphenol. In addition, a PC-PDMS copolymer manufactured by a method disclosed in Japanese Patent Publication 44-30105 or Japanese Patent Publication 45-20510 can also be used.

The PC oligomer having the repeating unit represented by the general formula (1) can be easily manufactured by a solvent method, wherein, in a solvent such as methylene chloride and in the presence of a known acid-receptor and a molecular weight regulating agent, a divalent phenol represented by the following general formula (4),

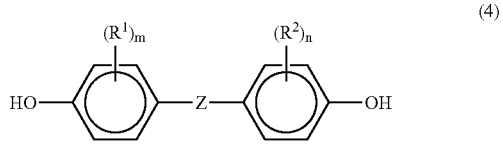

(wherein, $R^1$, $R^2$, Z, m and n are the same as those in the general formula (1)) and a carbonate precursor such as phosgene or a carbonic ester compound are reacted. That is, the PC oligomer can be manufactured, for example, in a solvent such as methylene chloride and in the presence of a known acid-receptor and a molecular weight regulating agent, by a reaction of a divalent phenol and a carbonate precursor such as phosgene, or by an ester-exchanging reaction etc. of a divalent phenol and a carbonate precursor such as diphenylcarbonate.

As a divalent phenol represented by the general formula (4), there are various types, and in particular, 2,2-bis(4-hydroxyphenyl)propane [bisphenol A] is preferable. Examples of divalent phenols other than bisphenol A, include, for example, bis(4-hydroxyphenyl)alkane other than bisphenol A, 1,1-(4-hydroxyphenyl)methane, 1,1-(4-hydroxyphenyl)ethane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether, bis(4-hydroxyphenyl)ketone, etc. Examples of other divalent phenols include, for example, hydroquinone, etc. These divalent phenols may be used alone or in a combination of two or more.

Also, as a carbonic ester compound, a diarylcarbonate such as diphenylcarbonate or the like, or a dialkylcarbonate such as dimethylcarbonate, diethylcarbonate or the like can be exemplified. And, as a molecular weight regulating agent, those generally used in polycarbonate polymerization may be used, and various types can be used. Specifically, examples of monovalent phenols include, for example, phenol, p-cresol, p-tert-butylphenol, p-tert-octylphenol, p-cumylphenol, nonylphenol, etc.

In the present invention, the PC oligomer used in the manufacture of the PC-PDMS copolymer may be a homopolymer obtained by using one kind of divalent phenol described above, or a copolymer obtained by using two kinds or more of them. Further, the PC oligomer may be a thermoplastic random branched polycarbonate obtained by a combination of a multi-functional aromatic compound and the divalent phenol described above.

In addition, when a PC-PDMS copolymer of which n-hexane-soluble part is 1.0% or less by weight is manufactured, it is preferable to perform the copolymerization mentioned above under the conditions, wherein, for example, while maintaining the content of the polyorganosiloxane in the copolymer 10% or less by weight, a polyorganosiloxane with the number of the repeating unit represented by the general formula (3) of 100 or more is used in the presence of a catalyst such as a tert-amine or the like with a content thereof of $5.3 \times 10^{-3}$ mol/(kg-oligomer) or more.

Next, a polycarbonate resin composing ingredient (B) of the polycarbonate resin composition of the present invention is not specifically limited, and can be easily manufactured by reacting a divalent phenol and phosgene or a carbonic ester compound. That is, the polycarbonate resin is manufactured, for example, in a solvent such as methylene chloride and in the presence of a known acid-receptor and a molecular weight regulating agent, by a reaction of a divalent phenol and a carbonate precursor such as phosgene, or by an ester-exchange reaction etc. of a divalent phenol and a carbonate precursor such as diphenylcarbonate. A divalent phenol used here may be the same as the compound represented by above general formula (4) or different. Also, the polycarbonate resin may be a homopolymer obtained by using one kind of the divalent phenol described above, or a copolymer obtained by using two kinds or more of them. Further, it may be a thermoplastic random branched polycarbonate obtained by a combination of a multi-functional aromatic compound and the divalent phenol described above.

Examples of carbonic ester compounds include diarylcarbonate such as diphenylcarbonate etc., or dialkylcarbonate such as dimethylcarbonate, diethylcarbonate, etc. As a molecular weight regulating agent, those generally used in polycarbonate polymerization may be used as described above, and various types can be used. Specific examples of monovalent phenols include, for example, phenol, p-cresol, p-tert-butylphenol, p-tert-octylphenol, p-cumylphenol, nonyl phenol, etc. are included.

With respect to 100 parts by weight of the sum of each ingredient (A), (B), and (C), the blending ratio of ingredient (A) is from 5 to 98 parts by weight, and preferably from 10 to 58 parts by weight, and the blending ratio of ingredient (B) is from 0 to 93 parts by weight, and preferably from 10 to 85 parts by weight. If the blending ratio of ingredient (A) is less than 5 parts by weight, dispersion of the polyorganosiloxane becomes poor, and sufficient flame retardancy may not be obtained. On the other hand, if the blending ratios of ingredients (A) and (B) are in the preferable ranges, a resin composition with good flame retardancy can be obtained. The content of polyorganosiloxane part in the PC-PDMS may be appropriately selected in accordance with the level of flame retardancy required for a final resin composition. The ratio of polyorganosiloxane part in ingredient (A) is, with respect to the sum of the ingredients (A) and (B), preferably from 0.3 to 10% by weight, and more preferably from 0.5 to 5% by weight. Here, if the ratio is less than 0.3% by weight, a sufficient oxygen index may not be obtained, and a desired flame retardancy may not be realized. Whereas, if the ratio is more than 10% by weight, the heat resistance of the resin decreases substantially, and also resulting in a cost increase of the resin. If the ratio is in the preferable ranges, a more appropriate oxygen index can be obtained, and a resin composition with excellent flame retardancy can be obtained. In addition, it is noted here that "polyorganosiloxane" does not include the polyorganosiloxane ingredient comprised in the organosiloxane of ingredient (E), which is excluded.

Titanium oxide as ingredient (C) of the present invention is used in the form of fine powder in order to impart high reflectance and low transparency, that is, to impart high light-shutting properties to the polycarbonate resin. Fine powder titanium oxide with various particle sizes can be manufactured by either a chlorine method or a sulfuric acid method. The titanium oxide used in the present invention may be either a rutile type or an anatase type. However, in view of thermal stability, weatherability, etc., the rutile type is preferable. In addition, the shape of the fine powder is not specifically limited, and a shape such as scale-like form, spherical form, amorphous form etc. may be appropriately selected and used.

The titanium oxide used as ingredient (C) is preferably surface treated with an amine compound, a polyol compound, as well as with aluminum hydrous oxide and/or silicon hydrous oxide. By performing this treatment, uniform dispersion and stability of the dispersion of the titanium oxide in the polycarbonate resin composition are improved, and furthermore, affinity with a flame retardant added subsequently is also improved. Therefore, the treatment is preferable for manufacturing a uniform composition. As aluminum hydrous oxide or silicon hydrous oxide, and an amine compound or a polyol compound mentioned here, hydrous alumina or hydrous silica, and triethanolamine, trimethylolethane or the like can be exemplified, respectively. In the above surface treatment, the treating method is not specifically limited, and an arbitrary method may be appropriately adopted. The amount of the surface treatment agent used on the titanium oxide particle surface in this treatment is not specifically limited. However, in view of light reflectance of the titanium oxide and moldability of the polycarbonate resin composition, the amount of about 0.1 to about 10.0% by weight with respect to the titanium oxide amount is appropriate.

Although there is no specific limitation on the particle size of the titanium oxide powder mentioned above used as ingredient (C) in the composition of the present invention, in order to efficiently exhibit the effects described above, the average particle size is preferably from about 0.1 to about 0.5 μm. The blending ratio of the titanium oxide in the polycarbonate resin composition of the present invention is from 2 to 50 parts by weight, preferably from 5 to 40 parts by weight, with respect to 100 parts by weight of the sum of the ingredients (A), (B), and (C). When the blending ratio is less than 2 parts by weight, the light-shutting properties are insufficient and light reflectance decreases substantially, which is not desirable. In addition, when the blending ratio exceeds 50 parts by weight, manufacturing of pellets by kneading and extruding becomes difficult, and also molding processing of the resin becomes difficult, which results in a tendency of frequent occurrence of silver streaks in moldings. In particular, since light-shutting properties and high light reflectance are required for a reflecting plate or a reflecting casing used in backlight of a liquid crystal television, a monitor, etc., the blending ratio of ingredient (C) is more preferably from 15 to 30 parts by weight.

The surface acid content of the titanium oxide used in the present invention is preferably 10 μmol/g or more, and the surface base content is preferably 10 μmol/g or more. If the surface acid content is less than 10 μmol/g or if the surface base content is less than 10 μmol/g, because dispersion of the titanium oxide may become insufficient, the reactivity thereof with an organosiloxane compound, that is, a stabilizing agent, decreases, and accordingly high luminance of the molding may not realized. The surface acid content of the titanium oxide is more preferably 15 μmol/g or more, and further more preferably 16 μmol/g or more. And the surface base content is more preferably 20 μmol/g or more, and further more preferably 25 μmol/g or more.

In addition, the surface acid content and the surface base content of the titanium oxide are measured by using a potentiometric titration in a nonaqueous solution. Specifically, the surface acid content is measured first by dispersing the titanium oxide in a 1/100-normal solution of n-propylamine in MIBK (methyl isobutyl ketone), and then performing a potentiometric titration of the supernatant with a 1/100-normal solution of perchloric acid in MIBK. Also, the surface base content is measured first by dispersing the titanium oxide in a 1/100-normal solution of acetic acid in MIBK (methyl isobutyl ketone), and then performing a potentiometric titration of the supernatant with a 1/100 solution of potassium methoxide in MIBK.

Next, a fibril-forming polytetrafluoroethylene (hereinafter, it may be abbreviated as PTFE), ingredient (D) of the polycarbonate resin composition of the present invention, may impart a melt-drop preventing effect as necessary, and impart high flame retardancy. The average molecular weight thereof is preferably 500,000 or more, more preferably from 500,000 to 10,000,000, and further more preferably from 1,000,000 to 10,000,000. The amount of ingredient (D) is, with respect to 100 parts by weight of the sum of each ingredient (A), (B), and (C), from 0 to 1.0 parts by weight, and preferably from 0.1 to 0.5 parts by weight. When this amount exceeds 1.0 parts by weight, it will not only bring about an adverse effect on the impact resistance and the appearance of a molding, but also will cause pulsation in the discharge of strand during kneading and extruding, which hinders stable manufacturing of pellets and is not favorable. If this amount is in the appropriate ranges, not only appropriate melt-drip preventing effect is obtained, but also a molding with excellent flame retardancy can be obtained.

The fibril-forming polytetrafluoroethylene (PTFE) used as ingredient (D) of the present invention is not specifically limited, and, for example, a compound classified as type 3 in ASTM standards can be used. Among PTFEs classified in this type, specifically, Teflon 6-J (trade name, manufactured by DuPont-Mitsui Fluorochemical Co., Ltd.), Polyflon D-1 and Polyflon F-103 (trade names, manufactured by Daikin Industries, Ltd.), etc. may be used. Also, in addition to type 3 materials, Algoflon F-5 (trade name, manufactured by Montefluos S.p.A.), Polyflon MPA FA-100 (trade name, manufactured by Daikin Industries, Ltd.) may be used. These PTFEs may be optionally used in a combination of two kinds or more. The fibril-forming polytetrafluoroethylene described above can be obtained, for example, by polymerizing tetrafluoroethylene in an aqueous solvent in the presence of sodium peroxydisulfide, potassium peroxydisulfide, or ammonium peroxydisulfide, under the pressure of 0.007 to 0.7 MPa, at the temperature of 0 to 200° C., and preferably 20 to 100° C. The PTFE as ingredient (D) is added as necessary in order to further improve flame retardancy of the polycarbonate resin composition, and is added with the ratio of 0 to 1.0 parts by weight, and preferably 0.1 to 0.5 parts by weight, with respect to 100 parts by weight of the sum of the ingredients (A), (B), and (C).

Next, an organosiloxane as ingredient (E) of the polycarbonate resin composition of the present invention is added in order to prevent degradation of the resin and to retain properties of the resin such as mechanical strength, stability, and heat resistance. Specific examples include alkylhydrogensilicones and alkoxysilicones.

As alkylhydrogensilicones, for example, methylhydrogensilicone, ethylhydrogensilicone, or the like are included. As alkoxysilicones, for example, methoxysilicone, ethoxysilicone, etc. are included.

Especially preferable alkoxysilicone is, specifically, a silicone compound containing an alkoxysilyl group wherein an alkoxy group is bonded directly or through a divalent hydrocarbon group to a silicon atom, and includes, for example, linear, ring-like, net-like, and partially branched linear organopolysiloxane, wherein linear organopolysiloxane is especially preferable. More specifically, an organopolysiloxane with a molecular structure in which an alkoxy group is bonded to a silicone main chain through a methylene chain is preferable.

As the organosiloxane used as ingredient (E), commercially available materials, for example, such as SH1107, SR2402, BY16-160, BY16-161, BY16-160E, BY16-161E, etc. manufactured by Dow Corning Toray Co., Ltd. can be used preferably.

The amount of the added organosiloxane, depending on the amount of the added titanium oxide, is preferably from 0.05 to 2.0 parts by weight with respect to 100 parts by weight of the sum of the ingredients (A), (B), and (C). If this amount is less than 0.05 parts by weight, the polycarbonate resin becomes degraded and the molecular weight thereof decreases. On the other hand, if the amount exceeds 2.0 parts by weight, the improvement of the effect expected for the added amount is not obtained and the product becomes economically unfavorable. In addition, silver streaks occur and the appearance of the product becomes poor.

To the polycarbonate resin composition of the present invention, various inorganic fillers, additives, other synthetic resins, elastomers, etc., other than the ingredients (A), (B), (C), (D), and (E) may be blended as necessary, within the range not damaging the object of the present invention. First, as the inorganic fillers blended to improve mechanical strength and durability or to increase the volume of the polycarbonate resin composition, specific examples include glass fiber (GF), carbon fiber, glass beads, glass flakes, carbon black, calcium sulfate, calcium carbonate, calcium silicate, alumina, silica, asbestos, talc, clay, mica, quartz powder, etc. Then, as the additives mentioned above, specific examples include oxidation inhibitors such as hindered phenol type, amine type, etc., ultraviolet absorbing agents such as benzotriazole type and benzophenone type, external lubricants such as aliphatic carboxylic acid ester type, paraffin type, silicone oil, polyethylene wax, etc., mold releasing agents, antistatic agents, colorants, etc. As other synthetic resins, specific examples include various resins such as polyethylene, polypropylene, polystyrene, AS resin (acrylonitrile-styrene copolymer), ABS resin (acrylonitrile-butadiene-styrene copolymer), polymethyl methacrylate, etc. In addition, as the elastomer, isobutylene-isoprene gum, styrene-butadiene gum, ethylene-propylene gum, acryl-type elastomers, etc. can be exemplified.

The polycarbonate resin composition of the present invention can be obtained by blending each of the ingredients (A) to (E) and other additives as necessary, and kneading them. The blending and kneading can be carried out by using conventional methods, for example, by a method using ribbon blender, Henschel mixer, Banbury mixer, drum tumbler, single-axis screw extruder, double-axis screw extruder, cokneader, multi-axis screw extruder, etc. In addition, the heating temperature in kneading is normally selected within the range of 240 to 320° C. The polycarbonate resin composition obtained in this way is formed into a molding with various sheet-like forms and various forms by applying various known molding methods, for example, injection molding, blow molding, extrusion molding, compression molding, calender molding, rotational molding, etc. A good molding can be also obtained by performing thermal molding or press molding of pre-sheet, sheet or films formed by extrusion molding of the polycarbonate resin composition of the present invention. As a method of thermal molding, specifically, a method of heating a pre-molding and subsequently molding under vacuum and/or with the pressure of compressed air can be used. The heating may be either from one side of the pre-molding or from both sides of the pre-molding, and moreover, the pre-molding can be heated by contacting to a heating source directly. In this case, if the heating temperature is less than 150° C., the pre-molding may not be formed uniformly, and if the heating temperature is more than 200° C., bubbling of the sheet tends to occur; thus these conditions are not preferable. The method of thermal molding is not specifically limited, and methods such as simple vacuum molding method, drape molding method, matched-die method, pressure bubble plug-assist vacuum molding method, plug-assist molding method, vacuum snap back molding method, pressure bubble vacuum snap back molding method, air-slip molding method, trapped-sheet contact-heating pressure molding method, simple air pressure molding method can be exemplified. In the case of the vacuum molding method, the pressure during the molding of 1 kg/cm$^2$ or less is preferable, and in the case of the air pressure molding method, the pressure of 3 to 8 kg/cm$^2$ is preferable. And, it is possible to combine the vacuum molding method and the air pressure molding method. By using this thermal molding, the molding can be made into a form in accordance with the type and number of light source, and into a form capable of uniform surface reflectance. The sheet or molding obtained in this way has excellent heat resistance and flame retardancy, and also high reflectance, therefore, it can be preferably used for manufacturing moldings such as chassis of OA equipment or moldings and parts of electrical and electronic fields.

In addition, by molding the polycarbonate resin composition of the present invention obtained in this way into a flat plate or a curved plate by using a conventional molding method, for example, an injection molding method, a compression molding method, etc., a light reflecting plate of the present invention can be obtained. This light reflecting plate is preferably used, for example, for lighting equipment and for backlight etc. of a liquid crystal display, and is especially preferable for backlight of the liquid crystal display. Since the light reflecting plate of the present invention uses materials that do not contain a bromine compound, it has excellent properties, such as excellent light-fastness and a low rate of reflectance degrading when used for a long period, which are lacking in conventional light reflecting plates.

Since the light reflector of the present invention uses materials that do not contain a bromine compound, it has excellent properties, such as excellent light-fastness and a low rate of reflectance degrading when used for a long period, which are lacking in conventional light reflecting plates.

In the light reflector of the present invention, a product A×B is preferably 150 or more, more preferably 250 or more, and further more preferably 300 or more, wherein A (in the unit of nm) is the surface roughness Ra of the light reflector measured through intermittent contact with an AFM (atomic force microscope) and B (in the unit of g) is the titanium oxide content thereof. If the product A×B is less than 200, light luminance of the light reflector may not be realized. As a measuring device of the surface roughness, a scanning type probe microscope (Auto Probe M5, manufactured by Thermo Microscopes), etc. can be used.

In addition, the light reflector of the present invention preferably has a Y value of 93 or more and the total light transmittance with a thickness of 1 mm of 0.6 or less.

The "Y value" described above refers to the stimulus value Y (luminance factor or luminous reflectance) determined using a spectrometry, in which the tri-stimulus values X, Y, Z of color of a sample (molding) are measured according to a method described in JIS K 7105. The preferable level of the reflecting property required for a light reflector represented by the Y value is said to be 93 or more. In addition, the "total light transmittance" refers to a value measured by using the method described in JIS K 7105, and in order to prevent decrease in luminance (illumination factor) caused by leakage of light in lighting equipment, it is desired that the total light transmittance with a thickness of 1 mm is 0.6 or less. A housing for lighting equipment, wherein the housing also serves as a reflector which has a Y value of 93 or more and a value of the total light transmittance with 1 mm thickness of 0.6 or less, is extremely excellent in reflecting properties of the reflector and luminance (illumination factor) of the lighting equipment.

The light reflector of the present invention has a Y value of more preferably 95 or more and further more preferably 97 or more, and the total light transmittance with a thickness of 1 mm of more preferably 0.3 or less and further more preferably 0.1 or less.

EXAMPLES

The present invention will be described in more detail with reference to examples, however the present invention shall not be construed as being limited thereto. Materials used in examples and comparative examples are as follows.

(A) Polycarbonate-Polyorganosiloxane Copolymer (PC-PDMS):

Tarflon FC 2200 [trade name, manufactured by Idemitsu Petrochemical Co., Ltd., Mv=22,000, PDMS content=1% by weight], Tarflon FC 1700 [trade name, manufactured by Idemitsu Petrochemical Co., Ltd., Mv=18,000, PDMS content=3.5% by weight], and Tarflon FC 1500 [trade name, manufactured by Idemitsu Petrochemical Co., Ltd., Mv=14,500, PDMS content=5% by weight].

(B) Polycarbonate (PC Resin):

Tarflon FN 1500 [trade name, manufactured by Idemitsu Petrochemical Co., Ltd., bisphenol A type polycarbonate, Mv=14,500], and Tarflon FN 1700 A [trade name, manufactured by Idemitsu Petrochemical Co., Ltd., bisphenol A type polycarbonate, Mv=18,000].

(C) Titanium Oxide:

(1) Titanium oxide powder, PF 726 [trade name, manufactured by Ishihara Sangyo Kaisha, Ltd., rutile type, the surface acid content of 17 μmol/g, and the surface base content of 26 μmol/g), and 2. Titanium oxide powder, CR-90 [trade name, manufactured by Ishihara Sangyo Kaisha, Ltd., rutile type, the surface acid content of 23 μmol/g, and the surface base content of 29 μmol/g].

(D) Polytetrafluoroethylene (PTFE):

Algoflon F-5 [trade name, manufactured by Montefluos S.p.A., with fibril-forming ability]

(E) Organosiloxane:

SR 2402 [trade name, manufactured by Dow Corning Toray Co., Ltd., a methoxysilicone with methoxy groups directly bonded to silicon atoms], SH 1107 [trade name, manufactured by Dow Corning Toray Co., Ltd., a methoxyhydrogenesilicone], BY 16-161 [trade name, manufactured by Dow Corning Toray Co., Ltd., a silicone containing methoxysilyl groups with methoxy groups bonded to silicon atoms through divalent hydrocarbon groups], SR 2402E [trade name, manufactured by Dow Corning Toray Co., Ltd., an ethoxysilicone with ethoxy groups directly bonded to silicon atoms], and BY 16-161E [trade name, manufactured by Dow Corning Toray Co., Ltd., an ethoxysilicone with ethoxy groups bonded to silicon atoms through hydrocarbon groups].

Examples 1 to 36

Pellets were prepared first by blending each of commercially available PC-PDMS copolymers, commercially available PC resins, titanium oxides, PTFE, and organosiloxanes described above according to the blending ratios shown in Table 1, and then by kneading them by using a vented double-axis extruder (manufactured by Toshiba Machine Co., Ltd., TEM-35B) at 280° C.

After drying the obtained pellets with hot wind at 120° C. for 5 hours, Izod test samples, thermal deformation test samples, and combustion test bars were prepared by using an injection molding machine (manufactured by Toshiba Machine Co., Ltd., IS 100EN), with molds according to a JIS standard, under the conditions including the molding temperature of 280° C. and the mold temperature of 80° C. And, plates with a geometry of 140 mm×140 mm×3.2 mm thickness for measuring the total light transmittance and reflectance, and combustion test pieces with a geometry of 127 mm×12 mm×1 mm thickness were prepared by using Nestal N 515/150 (manufactured by Sumitomo Heavy Industries, Ltd.), under the conditions including the molding temperature of 300° C. and the mold temperature of 80° C.

TABLE 1

| | Blending ratios (parts by weight) | | | | | | | | | | | |
|---|---|---|---|---|---|---|---|---|---|---|---|---|
| | (A) | | | (B) | | (C) | (D) | (E) | | | | |
| | FC1500 | FC1700 | FC2200 | FN1500 | FN1700A | PF726 | Algoflon F-5 | SR2402 | SH1107 | BY16-161 | SR2402E | BY16-161E |
| Example 1 | 95 | | | | | 5 | 0.5 | 0.2 | | | | |
| Example 2 | | 90 | | | | 10 | 0.5 | 0.6 | | | | |
| Example 3 | | | 85 | | | 15 | 0.5 | 0.8 | | | | |
| Example 4 | | 20 | | 60 | | 20 | 0.5 | 1.0 | | | | |
| Example 5 | | 45 | | 25 | | 30 | 0.5 | 1.5 | | | | |

TABLE 1-continued

| | Blending ratios (parts by weight) | | | | | | | | | | | |
|---|---|---|---|---|---|---|---|---|---|---|---|---|
| | (A) | | | (B) | | (C) | (D) | (E) | | | | |
| | FC1500 | FC1700 | FC2200 | FN1500 | FN1700A | PF726 | Algoflon F-5 | SR2402 | SH1107 | BY16-161 | SR2402E | BY16-161E |
| Example 6 | | 50 | | | | 50 | 0.5 | 2.0 | | | | |
| Example 7 | 95 | | | | | 5 | 0.5 | | 0.5 | | | |
| Example 8 | | 90 | | | | 10 | 0.5 | | 0.8 | | | |
| Example 9 | | | 85 | | | 15 | 0.5 | | 1.0 | | | |
| Example 10 | | 20 | | 60 | | 20 | 0.5 | | 1.3 | | | |
| Example 11 | | 45 | | 25 | | 30 | 0.5 | | 1.5 | | | |
| Example 12 | | 50 | | | | 50 | 0.5 | | 2.0 | | | |
| Example 13 | 95 | | | | | 5 | 0.5 | | | 0.5 | | |
| Example 14 | | 90 | | | | 10 | 0.5 | | | 0.8 | | |
| Example 15 | | | 85 | | | 15 | 0.5 | | | 1.0 | | |
| Example 16-1 | | 20 | | 60 | | 20 | 0.5 | | | 1.3 | | |
| Example 16-2 | | 20 | | 60 | | 20* | 0.5 | | | 1.3 | | |
| Example 17-1 | | 45 | | 25 | | 30 | 0.5 | | | 1.5 | | |
| Example 17-2 | | 45 | | 25 | | 30* | 0.5 | | | 1.5 | | |
| Example 18 | | 50 | | | | 50 | 0.5 | | | 2.0 | | |
| Example 19 | 95 | | | | | 5 | 0.5 | | | | 0.5 | |
| Example 20 | | 90 | | | | 10 | 0.5 | | | | 0.7 | |
| Example 21 | | | 85 | | | 15 | 0.5 | | | | 1.0 | |
| Example 22 | | 20 | | 60 | | 20 | 0.5 | | | | 1.2 | |
| Example 23 | | 45 | | 25 | | 30 | 0.5 | | | | 1.5 | |
| Example 24 | | 50 | | | | 50 | 0.5 | | | | 2.0 | |
| Example 25 | 95 | | | | | 5 | 0.5 | | | | | 0.5 |
| Example 26 | | 90 | | | | 10 | 0.5 | | | | | 0.7 |
| Example 27 | | | 85 | | | 15 | 0.5 | | | | | 1.0 |
| Example 28 | | 20 | | 60 | | 20 | 0.5 | | | | | 1.2 |
| Example 29 | | 45 | | 25 | | 30 | 0.5 | | | | | 1.5 |
| Example 30 | | 50 | | | | 50 | 0.5 | | | | | 2.0 |
| Example 31 | | | 95 | | | 5 | 0.5 | 0.2 | | | | |
| Example 32 | | | 90 | | | 10 | 0.5 | 0.6 | | | | |
| Example 33 | 85 | | | | | 15 | 0.5 | 0.8 | | | | |
| Example 34 | | | 80 | | | 20 | 0.5 | 1.0 | | | | |
| Example 35 | | | 70 | | | 30 | 0.5 | 1.5 | | | | |
| Example 36 | | | 50 | | | 50 | 0.5 | 2.0 | | | | |
| Comparative Example 1 | 95 | | | | | 5 | 0.5 | 0 | | | | |
| Comparative Example 2 | | 90 | | | | 10 | 0.5 | | | 0 | | |
| Comparative Example 3 | | 85 | | | | 15 | 0.5 | | | 0 | | |
| Comparative Example 4 | | | 80 | | | 20 | 0.5 | | | | 0 | |
| Comparative Example 5 | | | 70 | | | 30 | 0.5 | | | | | 0 |
| Comparative Example 6 | | | | 50 | | 50 | 0.5 | | | | | |

*The ingredient (C) used in Examples 16-2 and 17-2 was titanium oxide power CR-90.

In order to conduct performance evaluation of pellets and moldings prepared by using the resin compositions with various blending ratios described above, the Izod strength, thermal deformation temperature, reflectance, transmittance, and flame retardancy were evaluated by the following methods.

(a) Izod Strength:

The Izod strength was evaluated according to ASTM D256 by using samples with a thickness of ⅛ inch at 23° C., in the unit of kJ/m².

(b) Thermal Deformation Temperature:

The thermal deformation temperature was evaluated according to ASTM D648 with a low load of 4.6 kg/cm² in the unit of ° C.

(c) Reflectance:

The reflectance was evaluated based on the Y value measured with an LCM spectrophotometer, MS2020-plus [manufactured by Macbeth Corp.], by using flat plate samples prepared for reflectance measurement as described above.

(d) Transmittance:

The parallel light transmittance was measured according to JIS K7105, with a testing machine manufactured by Nippon Denshoku Industries Co., Ltd.

(e) Flame Retardancy:

Vertical combustion tests (UL 94 V-0 test) were performed according to UL 94 by using combustion test samples prepared as described above.

The results of evaluation are shown in Table 2.

TABLE 2

Results of evaluation

| | PDMS content (% by weight) | Izod strength (KJ/m$^2$) | Thermal deformation Temperature (°C.) | Reflectance (Y value) | Transmittance (%) | Flame retardancy (Passed or Failed) |
|---|---|---|---|---|---|---|
| Example 1 | 5.0 | 50 | 138 | 92.0 | 0.6 | Passed |
| Example 2 | 3.5 | 65 | 138 | 96.5 | 0.4 | Passed |
| Example 3 | 1.0 | 60 | 138 | 97.6 | 0.3 | Passed |
| Example 4 | 0.875 | 50 | 137 | 97.8 | 0.2 | Passed |
| Example 5 | 2.25 | 35 | 137 | 98.1 | 0.0 | Passed |
| Example 6 | 3.5 | 20 | 135 | 98.2 | 0.0 | Passed |
| Example 7 | 5.0 | 48 | 138 | 92.0 | 0.6 | Passed |
| Example 8 | 3.5 | 60 | 138 | 96.5 | 0.4 | Passed |
| Example 9 | 1.0 | 55 | 138 | 97.6 | 0.3 | Passed |
| Example 10 | 0.875 | 25 | 137 | 97.8 | 0.2 | Passed |
| Example 11 | 2.25 | 15 | 137 | 98.1 | 0.0 | Passed |
| Example 12 | 3.5 | 5 | 135 | 98.2 | 0.0 | Passed |
| Example 13 | 5.0 | 45 | 138 | 91.9 | 0.6 | Passed |
| Example 14 | 3.5 | 65 | 138 | 96.4 | 0.4 | Passed |
| Example 15 | 1.0 | 65 | 138 | 97.5 | 0.3 | Passed |
| Example 16-1 | 0.875 | 50 | 137 | 97.7 | 0.2 | Passed |
| Example 16-2 | 0.875 | 49 | 136 | 97.9 | 0.1 | Passed |
| Example 17-1 | 2.25 | 40 | 137 | 98.0 | 0.0 | Passed |
| Example 17-2 | 2.25 | 38 | 136 | 98.9 | 0.0 | Passed |
| Example 18 | 3.5 | 25 | 135 | 98.1 | 0.0 | Passed |
| Example 19 | 5.0 | 52 | 138 | 91.7 | 0.6 | Passed |
| Example 20 | 3.5 | 55 | 138 | 96.2 | 0.4 | Passed |
| Example 21 | 1.0 | 60 | 138 | 97.3 | 0.2 | Passed |
| Examples 22 | 0.875 | 30 | 137 | 97.5 | 0.2 | Passed |
| Examples 23 | 2.25 | 20 | 137 | 97.8 | 0.0 | Passed |
| Examples 24 | 3.5 | 5 | 135 | 97.9 | 0.0 | Passed |
| Examples 25 | 5.0 | 45 | 138 | 91.5 | 0.6 | Passed |
| Examples 26 | 3.5 | 58 | 138 | 96.1 | 0.4 | Passed |
| Examples 27 | 1.0 | 60 | 138 | 97.2 | 0.3 | Passed |
| Examples 28 | 0.875 | 45 | 137 | 97.4 | 0.2 | Passed |
| Examples 29 | 2.25 | 40 | 137 | 97.7 | 0.0 | Passed |
| Examples 30 | 3.5 | 20 | 135 | 97.8 | 0.0 | Passed |
| Examples 31 | 5.0 | 48 | 138 | 91.5 | 0.6 | Passed |
| Examples 32 | 3.5 | 67 | 138 | 96.0 | 0.4 | Passed |
| Examples 33 | 1.0 | 58 | 138 | 97.1 | 0.3 | Passed |
| Examples 34 | 3.5 | 48 | 137 | 97.3 | 0.2 | Passed |
| Examples 35 | 3.5 | 33 | 137 | 97.6 | 0.0 | Passed |
| Examples 36 | 3.5 | 15 | 135 | 97.7 | 0.0 | Passed |
| Comparative Example 1 | 0 | 7 | 120 | 89 | 0.4 | Failed |
| Comparative Example 2 | 0 | 10 | 115 | 90 | 0.2 | Failed |
| Comparative Example 3 | 0 | 10 | 108 | 80 | 0.2 | Failed |
| Comparative Example 4 | 0 | 5 | 100 | 75 | 0.1 | Failed |
| Comparative Example 5 | 0 | 3 | 95 | 70 | 0.0 | Failed |
| Comparative Example 6 | 0 | 1 | 90 | 60 | 0.0 | Failed |

In addition, by using the resin pellets described above, corrugated moldings with a geometry of 300 mm×240 mm×1 mm thickness were injection molded by using a 350-ton injection molding machine (manufactured by Nissei Plastic Industrial Co., Ltd., AZ7000), under the conditions including the molding temperature of 310° C. and the mold temperature of 95° C., and reflecting plates thereof were prepared. Also, by using a 35 mm φ single-axis extrusion machine equipped with a T-shaped die lip, extruded sheets with a thickness of 1 mm were obtained under the conditions including the cylinder temperature of 280° C. and the die temperature of 120° C. Then, by performing heat pressing of these sheets, corrugated moldings with a geometry of 300 mm×240 mm×1 mm thickness were obtained. When a light source is placed on these corrugated objects, reflected light with substantial brightness was observed, and therefore each corrugated object was confirmed to serve as a reflecting plate. The surface roughness Ra (A) was in the range from 10 to 25 nm. When the titanium oxide was from 15 to 50 parts by weight, values of the product A×B were found to be from 150 to 1250.

Comparative Examples 1 to 6

Resin pellets were prepared in the same manner as those of Example 1, by using materials similar to those used in Example 1 with the blending ratios shown in the column of Comparative Examples of Table 1, and plates for reflectance measurement and combustion test samples were prepared in the same manner. Subsequently, the Izod strength, thermal deformation temperature, reflectance, transmittance, and flame retardancy were evaluated. The results are shown in the column of Comparative Examples of Table 2.

In addition, pellets were prepared according to the following procedures: First, Tarflon A-2200 [trade name, Mv=21,000, manufactured by Idemitsu Petrochemical Co., Ltd.] or Iupilon H4000 [trade name, Mv=15,000, manufactured by Mitsubishi Gas Chemical Company, Inc.] as base polymers representing PC-PDMS copolymers and polycarbonate resins (PC) according to (a) to (d) to be described below, and the titanium oxide PC3 manufactured by Ishihara Sangyo Kaisha, Ltd. (rutile type, the surface acid content: 10 µmol/g, and the surface base content: 4 µmol/g) as titanium oxide were dry-blended with a ratio of 50 parts by weight of the PC-PDMS, 40 parts by weight of the PC resin, and 5 parts by weight of the titanium oxide. Then, the blended mixture was kneaded at 260° C. by using a vented single-axis extruder [manufactured by Nakatani Machine Corp., NVC-50] to prepare the pellets. By using the pellets, corrugated moldings were prepared in the manner similar to that of Examples described above. Then, a light source was placed on the corrugated moldings and brightness was tested. In all of the Comparative Examples, the brightness was inferior to that of Examples. Also, the values of Ra (A) were from 2 to 5 nm, and the values of the product A×B were from 75 to 100.

PC-PDMS Copolymers:

Copolymer (A): a PC-PDMS copolymer obtained by copolymerization of a polycarbonate oligomer (degree of polymerization: 3 to 4) obtained by reacting bisphenol A and phosgene, and a reactive PDMS with the number of dimethylsilanoxy repeating unit of 150 obtained by polymerization of octamethylcyclotetrasiloxane and 1,1,3,3-tetramethyldisiloxane.

Copolymer (B): the PC-PDMS copolymer according to Copolymer (A), wherein the number of dimethylsilanoxy repeating unit in the reactive PDMS is 350.

Copolymer (C): the PC-PDMS copolymer according to Copolymer (A), wherein the number of dimethylsilanoxy repeating unit in the reactive PDMS is 20.

Copolymer (D): the PC-PDMS copolymer according to Copolymer (A), wherein the number of dimethylsilanoxy repeating unit in the reactive PDMS is 80.

INDUSTRIAL APPLICABILITY

The polycarbonate resin composition according to the present invention has no negative impact on the environment since additives etc. thereof such as a flame retardant do not contain a bromine compound or a phosphorous compound, and is a resin composition with high light reflectance and light-shutting properties, and excellent flame retardancy when it is made into a molding. By taking advantage of these characteristics, the polycarbonate resin composition of the present invention can be preferably used as various parts and moldings in the fields such as OA equipment, electrical and electronic equipment, home equipment, lighting equipment, displays, etc.

The invention claimed is:

1. A polycarbonate resin composition comprising:
(A) 5 to 98 parts by weight of a polycarbonate-polyorganosiloxane copolymer,
(B) 0 to 93 parts by weight of a polycarbonate resin,
(C) 2 to 50 parts by weight of titanium oxide,
(D) 0 to 1.0 parts by weight of a fibril-forming polytetrafluoroethylene, and
(E) 0.05 to 2.0 parts by weight of an alkylhydrogensilicone or an alkoxysilicone,
wherein
the sum of the ingredients (A), (B), and (C) is 100 parts by weight, and comprising no phosphorus compound flame retardant.

2. The polycarbonate resin composition according to claim 1, wherein the ratio of the polyorganosiloxane part in the polycarbonate-polyorganosiloxane copolymer of ingredient (A) to the sum of the ingredients (A) and (B) is 0.3 to 10% by weight.

3. The polycarbonate resin composition according to claim 1, wherein the polyorganosiloxane in the polycarbonate-polyorganosiloxane copolymer of ingredient (A) is polydimethylsiloxane.

4. The polycarbonate resin composition according to claim 1, wherein the surface acid content of the titanium oxide of ingredient (C) is 10 µmol/g or more.

5. The polycarbonate resin composition according to claim 1, wherein the surface base content of the titanium oxide of ingredient (C) is 10 µmol/g or more.

6. The polycarbonate resin composition according to claim 1, wherein ingredient (B) is an alkoxysilicone, which is an organopolysiloxane with a molecular structure in which an alkoxy group bonds to a silicone main chain through a methylene group.

7. A polycarbonate resin molding obtained by molding of the polycarbonate resin composition according to claim 1.

8. The polycarbonate resin molding according to claim 7, wherein the molding is a plate, a sheet, a film, or a molding obtained by thermomolding or pressmolding thereof.

9. The polycarbonate resin molding according to claim 7, wherein the molding is a molding obtained by injection-molding.

10. The polycarbonate resin molding according to claim 7, wherein the molding is a light reflector.

11. The polycarbonate resin molding according to claim 10, wherein a reflectance (Y value) of the polycarbonate resin composition composing the light reflector is 93 or more and a total light transmittance thereof (wall thickness: 1 mm) is 0.6 or less.

12. The polycarbonate resin molding according to claim 11, wherein a product A×B is 150 or more, wherein A (in the unit of nm) is the surface roughness Ra of the light reflector measured through intermittent contact with an AFM (atomic force microscope) and B (in the unit of g) is the titanium oxide content thereof.

13. The polycarbonate resin composition according to claim 1, wherein ingredient (E) is an alkylhydrogensilicone.

14. The polycarbonate resin composition according to claim 1, wherein ingredient (E) is an alkoxysilicone, which contains an alkoxysilyl group wherein alkoxy is bonded directly or through a divalent hydrocarbon group to a silicon atom.

15. The polycarbonate resin composition according to claim 14, wherein the alkoxysilicone is a linear organopolysiloxane.

* * * * *